United States Patent
Fu et al.

(10) Patent No.: US 12,395,261 B2
(45) Date of Patent: Aug. 19, 2025

(54) TIME-OF-DAY CORRECTION FOR NETWORK CLOCK PROTOCOL

(71) Applicant: Marvell Asia Pte Ltd, Singapore (SG)

(72) Inventors: Yao Fu, Shanghai (CN); Lenin Kumar Patra, Dublin, CA (US); Jeng-Jong Douglas Chen, Santa Clara, CA (US); Xiaoqing Ma, Shanghai (CN); Joergen P. R. Hofman-Bang, Ballerup (DK); Yangyang Zhang, Shanghai (CN)

(73) Assignee: Marvell Asia Pte Ltd, Singapore (SG)

( * ) Notice: Subject to any disclaimer, the term of this patent is extended or adjusted under 35 U.S.C. 154(b) by 689 days.

(21) Appl. No.: 17/659,869

(22) Filed: Apr. 20, 2022

(65) Prior Publication Data

US 2022/0345238 A1    Oct. 27, 2022

Related U.S. Application Data

(60) Provisional application No. 63/309,775, filed on Feb. 14, 2022, provisional application No. 63/177,370, filed on Apr. 20, 2021.

(51) Int. Cl.
*H04J 3/06* (2006.01)

(52) U.S. Cl.
CPC ........... *H04J 3/0679* (2013.01); *H04J 3/062* (2013.01); *H04J 3/0685* (2013.01)

(58) Field of Classification Search
None
See application file for complete search history.

(56) References Cited

U.S. PATENT DOCUMENTS

| | | | | |
|---|---|---|---|---|
| 2011/0286560 A1* | 11/2011 | Pignatelli | ............. | H04J 3/0655 375/356 |
| 2023/0208543 A1* | 6/2023 | Seethamraju | ......... | H04J 3/0673 370/503 |

\* cited by examiner

*Primary Examiner* — Kodzovi Acolatse

(57) ABSTRACT

In a network having at least one slave node including a slave clock, a method of adjusting the slave clock relative to a master clock of a master node includes, at the slave node, correcting a time of day of the slave clock using (a) a slave pulse signal having a known slave pulse rate, (b) a time-of-day counter of the slave node, and (c) a master pulse signal, based on values of the slave clock at nearest corresponding edges of the slave pulse signal and the master pulse signal, and correcting a frequency of the slave clock using the slave pulse signal, a clock signal of the slave node, and the master pulse signal, based on values of the slave clock at nearest corresponding edges of the master pulse signal. No other clock signal from outside the slave node is used for the corrections.

20 Claims, 7 Drawing Sheets

TIME-OF-DAY CORRECTION FOR NETWORK CLOCK PROTOCOL

CROSS REFERENCE TO RELATED APPLICATIONS

This disclosure claims the benefit of commonly-assigned U.S. Provisional Patent Applications Nos. 63/177,370 and 63/309,775, filed Apr. 20, 2021 and Feb. 14, 2022 respectively, each of which is hereby incorporated by reference herein in its respective entirety.

FIELD OF USE

This disclosure relates to an Ethernet node device which is configured in hardware for time-of-day correction. More particularly, this disclosure relates to an Ethernet node device which is configured in hardware to separately correct phase and frequency of its time-of-day clock based on a "pulse-per-second (PPS)" signal from another node.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Ethernet devices operate under a clock protocol known as Precision Time Protocol (PTP) according to which each device, or node, maintains its own time of day clock, but periodically corrects its time-of-day clock by querying a master node, which is known to have the correct time-of-day. If the master node maintains the correct time for the entire PTP clock domain, it may be referred to as a "grandmaster" node. The exchange of time query messages by "slave" (i.e., non-master) nodes to a master node or nodes, and the resulting reply messages by the master node to each slave node, adds to network traffic.

SUMMARY

In accordance with implementations of the subject matter of this disclosure, in a network having at least one master node, the master node having a master clock and outputting a master pulse signal having a known master pulse rate, the network further having at least one slave node including a slave clock, a method of adjusting the slave clock relative to the master clock includes, at the slave node, correcting a time of day of the slave clock using (a) a slave pulse signal of the slave node, the slave pulse signal having a known slave pulse rate, (b) a time-of-day counter of the slave node, and (c) the master pulse signal, without using any other clock signal from outside the slave node, based on values of the slave clock at nearest corresponding edges of the slave pulse signal and the master pulse signal, and correcting a frequency of the slave clock using the slave pulse signal of the slave node, a clock signal of the slave node, and the master pulse signal, without using any other clock signal from outside the slave node, based on values of the slave clock at nearest corresponding edges of the master pulse signal.

In a first implementation of such a method, using the slave pulse signal may include using a slave pulse signal that is a "pulse-per-second" signal having a slave pulse rate of 1 pulse per second, and using the master pulse signal may include using a master pulse signal that is a "pulse-per-second" signal having a master pulse rate of 1 pulse per second.

In a second implementation of such a method, using the slave pulse signal may include using a slave pulse signal that is a "pulse-per-second" signal having a slave pulse rate of 1,000 pulses per second, and using the master pulse signal may include using a master pulse signal that is a "pulse-per-second" signal having a master pulse rate of 1,000 pulses per second.

In a third implementation of such a method, using the slave pulse signal may include using a slave pulse signal that is a "pulse-per-second" signal having a slave pulse rate of 62,500 pulses per second, and using the master pulse signal may include using a master pulse signal that is a "pulse-per-second" signal having a master pulse rate of 62,500 pulses per second.

In a fourth implementation of such a method, correcting the time of day of the slave clock may include retrieving a first counter value from a slave time-of-day counter on occurrence of an edge of the slave pulse signal, retrieving a second counter value from the slave time-of-day counter on occurrence of an edge of the master pulse signal that is the nearest corresponding edge to edge of the slave pulse signal, subtracting the first counter value from the second counter value to yield a time-of-day correction, and adding the time-of-day correction to a current counter value.

According to a first aspect of that fourth implementation, the method may further include, before adding the time-of-day correction to the current counter value, determining whether the time-of-day correction exceeds one-half an interval of the slave pulse signal, and when the time-of-day correction exceeds one-half an interval of the slave pulse signal, inverting algebraic sign of the time-of-day correction, and performing again the retrieving the first counter value, the retrieving the second counter value, and the subtracting.

According to a second aspect of that fourth implementation, adding the time-of-day correction to the current counter value may include adding all of the time-of-day correction to the current counter value in a single operation.

According to a third aspect of that fourth implementation, adding the time-of-day correction to the current counter value may include adding each of a plurality of portions of the time-of-day correction in a corresponding plurality of operations spread over time.

In a fifth implementation of the subject matter of this disclosure, correcting the frequency of the slave clock may include retrieving a first counter value from a slave time-of-day counter on occurrence of a first edge of the master pulse signal, retrieving a second counter value from the slave time-of-day counter on occurrence of a second edge of the master pulse signal that is the nearest corresponding edge to the first edge of the master pulse signal, subtracting the first counter value from the second counter value to yield a first intermediate correction value, subtracting the first intermediate correction value from duration of an interval of the master pulse signal to yield a second intermediate correction value, and dividing the second intermediate correction value by the first intermediate correction value to yield an interval correction for the slave pulse signal.

According to one aspect of that fifth implementation, correcting the frequency of the slave clock may further include adding the interval correction to the slave pulse signal.

According to implementations of the subject matter of this disclosure, in a network that includes at least one master node having a master clock and outputting a master pulse signal having a known master pulse rate, a slave node includes a clock signal generator configured to output a slave clock signal, the slave clock signal having a slave clock frequency, a time of day counter configured to increment at each interval of the slave clock signal to indicate a time of day, a slave pulse signal generator configured to output a slave pulse signal, the slave pulse signal having a known slave pulse rate lower than the slave clock frequency, and clock correction circuitry configured to correct the time of day using the slave pulse signal and the master pulse signal, without using any other clock signal from outside the slave node, based on values of the slave clock at nearest corresponding edges of the slave pulse signal and the master pulse signal, and correct the slave clock frequency using the slave pulse signal, the slave clock signal, and the master pulse signal, without using any other clock signal from outside the slave node, based on values of the slave clock at nearest corresponding edges of the master pulse signal.

In a first implementation of such a slave node, the slave pulse signal generator may be configured to output a slave pulse signal that is a "pulse-per-second" signal having a slave pulse rate of 1 pulse per second, and the clock correction circuitry may be configured to use a master pulse signal that is a "pulse-per-second" signal having a master pulse rate of 1 pulse per second.

In a second implementation of such a slave node, the slave pulse signal generator may be configured to output a slave pulse signal that is a "pulse-per-second" signal having a slave pulse rate of 1,000 pulses per second, and the clock correction circuitry may be configured to use a master pulse signal that is a "pulse-per-second" signal having a master pulse rate of 1,000 pulses per second.

In a third implementation of such a slave node, the slave pulse signal generator may be configured to output a slave pulse signal that is a "pulse-per-second" signal having a slave pulse rate of 62,500 pulses per second, and the clock correction circuitry is configured to use a master pulse signal that is a "pulse-per-second" signal having a master pulse rate of 62,500 pulses per second.

In a fourth implementation of such a slave node, the clock correction circuitry may be configured to correct the time of day by retrieving a first counter value from the time-of-day counter on occurrence of an edge of the slave pulse signal, retrieving a second counter value from the time-of-day counter on occurrence of an edge of the master pulse signal that is the nearest corresponding edge to the edge of the slave pulse signal, subtracting the first counter value from the second counter value to yield a time-of-day correction, and adding the time-of-day correction to a current value of the time-of-day counter.

According to a first aspect of that fourth implementation, the clock correction circuitry may be further configured to, before adding the time-of-day correction to the current counter value, determine whether the time-of-day correction exceeds one-half an interval of the slave pulse signal, and when the time-of-day correction exceeds one-half an interval of the slave pulse signal invert algebraic sign of the time-of-day correction, and perform again the retrieving the first counter value, the retrieving the second counter value, and the subtracting.

According to a second aspect of that fourth implementation, the clock correction circuitry may be configured to add all of the time-of-day correction to the current counter value in a single operation.

According to a third aspect of that fourth implementation, the clock correction circuitry may be configured to add each of a plurality of portions of the time-of-day correction to the current counter value in a corresponding plurality of operations spread over time.

In a fifth implementation of such a slave node, the clock correction circuitry may be configured to correct the frequency of the slave clock by retrieving a first counter value from the time-of-day counter on occurrence of a first edge of the master pulse signal, retrieving a second counter value from the time-of-day counter on occurrence of a second edge of the master pulse signal that is the nearest corresponding edge to the first edge of the master pulse signal, subtracting the first counter value from the second counter value to yield a first intermediate correction value, subtracting the first intermediate correction value from duration of an interval of the master pulse signal to yield a second intermediate correction value, and dividing the second intermediate correction value by the first intermediate correction value to yield an interval correction for the slave pulse signal.

According to an aspect of that fifth implementation, the clock correction circuitry may be configured to correct the frequency of the slave clock by adding the interval correction to the slave pulse signal.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
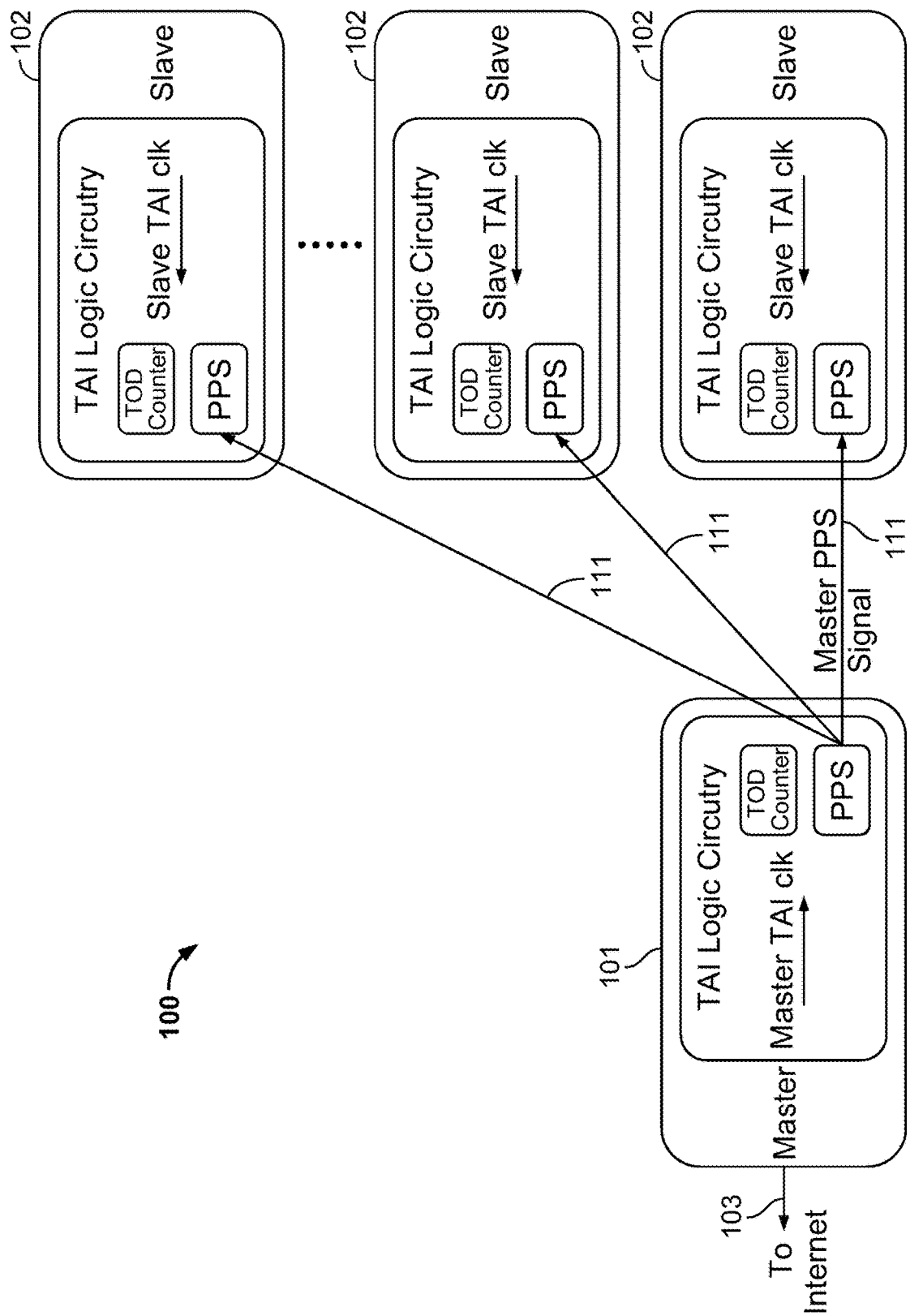
FIG. 1 is a diagram showing a plurality of nodes in a time domain in which time of day can be corrected in accordance with implementations of the subject of this disclosure.

As noted above, Ethernet devices operate under a clock protocol known as Precision Time Protocol (PTP) according to which each device, or node, maintains its own time of day clock, but periodically corrects its time-of-day clock by querying a master node, which is known to have the correct time-of-day. If the master node maintains the correct time for the entire PTP clock domain, it may be referred to as a "grandmaster" node. The exchange of time query messages by "slave" (i.e., non-master) nodes to a master node or nodes, and the resulting reply messages by the master node to each slave node, adds to network traffic.

Under the PTP protocol, governed by the IEEE 1588 standard, each node maintains the time of day as a counter value, counting from a known initial time, at a nominal clock rate. Thus, for a 1 GHz clock, the counter increments by 1 every nanosecond, and every billion counts of the counter signifies 1 second. Each node also generates a PPS signal. While "PPS" originally stood for "pulse per second," the PPS signal may run faster than 1 pulse per second. For example, in some implementations of a 1 GHz clock, the PPS signal may run at 1 kHz, having a rising edge every millisecond. In such a case, each period or interval of the PPS signal would correspond to 1 million intervals of the 1 GHz clock.

When the clock at a PTP node has the wrong time of day, then there are two errors that may require correction. First, the nominal time of day needs to be reset to the correct time of day. Second, if the time of day was originally correct and is now wrong, then the clock rate necessarily is either fast or slow and that clock rate needs to be corrected. Correction of the nominal time of day may be referred to as a phase correction, while correction of the clock rate may be referred to as a frequency correction.

In accordance with implementations of the subject matter of this disclosure, both the phase (i.e., time of day) and frequency (i.e., clock rate) of the slave (i.e., local) clock can be corrected using only the slave clock (including both the slave time of day and the slave PPS) and a PPS signal from the master node or any other node (which reduces the amount of network traffic as compared to a query-and-response exchange between the slave node and the master node or other node).

The required time-of-day (i.e., phase) correction may be determined by recording the local time of day on the arrival of a rising edge of one of the PPS signals (i.e., the local PPS signal or the master PPS signal) and then recording the local time of day on the arrival of a rising edge of the respective other PPS signal (i.e., the master PPS signal or the local PPS signal). The difference between the two time-of-day values is the required time-of-day (or, phase) adjustment.

The sign of the adjustment depends on which PPS signal (master or slave) arrived first. If the slave PPS edge arrived first, the required adjustment is deemed positive, while if the master PPS edge arrived first, the required adjustment is deemed negative. However, if the magnitude of the adjustment exceeds half of a PPS period or interval, then the phase error as measured exceeds 180°. If so, the sign is inverted and the magnitude of the time-of-day difference is measured again starting with the next edge of whichever PPS was detected second in the original measurement.

The resulting phase adjustment (sign and magnitude) is applied to the slave time of day. While the entire correction could be applied at once, in some implementations the correction may be applied gradually—e.g., 1 ns per clock cycle—to minimize discontinuity.

In some implementations, certain error checks may be performed. For example, if a certain number of rising edges of one of the PPS signals arrives without any rising edge of the other of the PPS signals arriving, then an error condition is assumed and the process starts over. In one implementation, the number of rising edges of the same PPS signal that is deemed to indicate an error condition is 4. However, other values may be used. Generally, one missed clock edge is not deemed to be an error, but the specific number may be empirically determined. As another example, in some implementations, if the measured time-of-day difference is too large, an error is assumed and the process starts over. In one implementation, the measured time-of-day difference is deemed to be too large if it exceeds 3 seconds, but other values may be used to indicate an error.

The frequency correction is derived by determining the number of clock cycles in the difference between (a) the length of a period of the master PPS signal and (b) the length of a period of the slave PPS signal. As noted above, the only signal used from the master node is the master PPS signal, so the clock cycle determination is based on the slave clock cycle. Although the slave clock cycle is presumed to have drifted since initialization or since the prior correction, it is not so far off to affect this correction, assuming the correction is performed often enough (as determined by a variable rg_freq_adj_time_window, discussed below). Once the frequency correction value has been derived, it may be applied to every cycle of the slave clock.

The subject matter of this disclosure may be better understood by reference to FIGS. 1-7.

FIG. 1 is a diagram showing a plurality of nodes in a PTP time domain 100, including one master node 101 and a plurality of slave nodes 102 in a PTP network. In this implementation, master node 101 has a respective point-to-point link 111 to each respective slave node 102. However, in other implementations (not shown), a link may be daisy-chained from master node 101 to a first one of slave nodes 102 and then, serially, to each additional one of slave nodes 102. Moreover, while only one master node 101 is shown (which would make master node 101 a "grandmaster" node), there may be plural master nodes 101, each associated with its own respective plurality of slave nodes 102. If master node 101 is a grandmaster node, it may obtain the correct time of day from an external time base—e.g., via the Internet at 103. If master node 101 is not a grandmaster node, it may obtain the correct time of day from a grandmaster node (not shown), or from an external time base.

Figure 2:
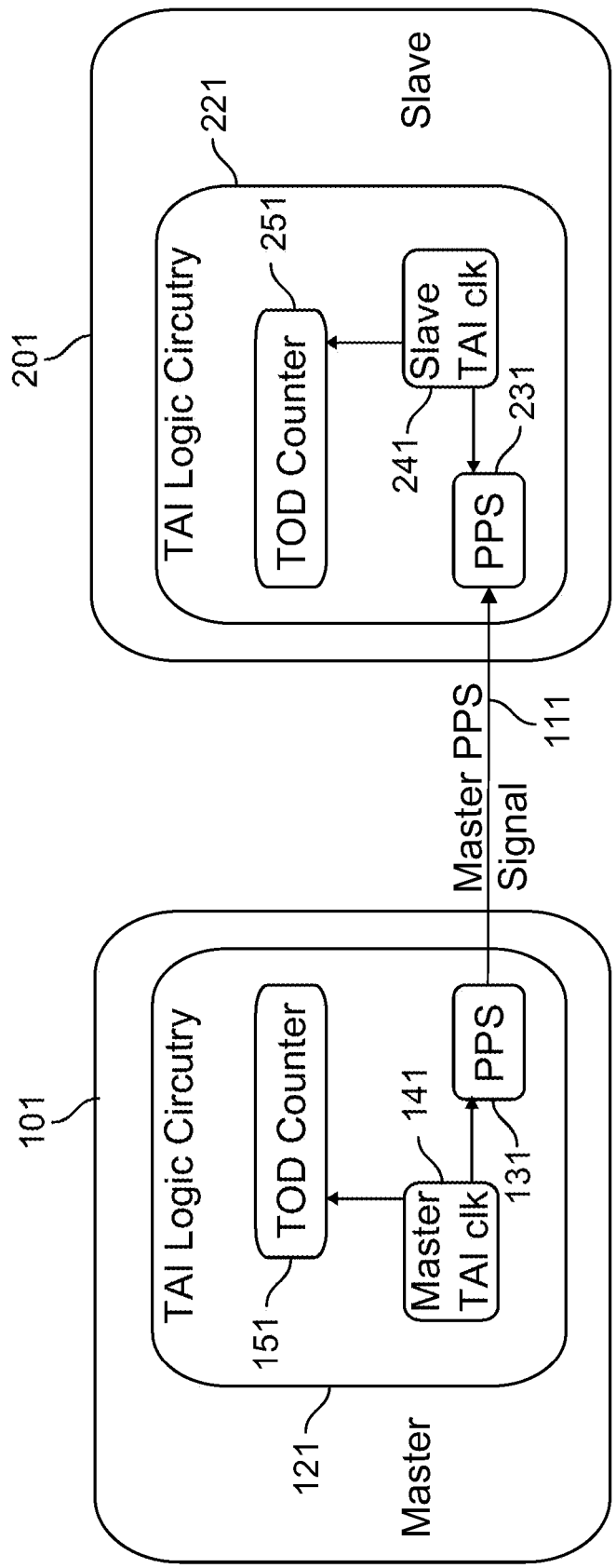
FIG. 2 illustrates the interaction of one master node and one slave node in a time domain such as that of FIG. 1.

FIG. 2 shows in more detail the interaction of master node 101 with a single slave node 201 out of slave nodes 102. Each node 101, 201 includes Time Application Interface (TAI) logic circuitry 121, 221 that maintains a local time of day in a respective time-of-day (TOD) counter 151, 251, and also generates a PPS signal at 131, 231. Although historically the PPS signal generated one pulse per second (hence its name), a PPS signal may generate pulse at a rate of one pulse per second (1 Hz), 1,000 pulses per second or one pulse per millisecond (1 kHz), or 16,000 pulses per second or one pulse per 62,500 nanoseconds (16 kHz), or other suitable pulse rates.

Although TAI logic circuitry 121 of master node 101 (master TAI) obtains the time of day from an external source, in some implementations the master TAI 121 may not continually check the external source. Rather master TAI 121 may maintain the time of day based on its own internal oscillator (Master TAI clk) 141, which also is the basis for PPS signal 131 of master node 101 (master PPS). The master PPS signal 131 is thus an indication of the frequency of the master TAI oscillator 141.

Similarly, although TAI logic circuitry 221 of slave node 201 (slave TAI) obtains the time of day from master node 101, slave TAI 221 may not continually check master node 101. Rather slave TAI 221 may maintains the time of day in a time-of-day counter 251 based on its own internal oscillator (Slave TAI clk) 241, which also is the basis for PPS signal 231 of slave node 101 (slave PPS). The slave PPS signal 231 is thus an indication of the frequency of the slave TAI oscillator 241.

In operations described herein, the time of day at master node 101 is presumed to be correct, because the master TAI oscillator 141, and therefore the master PPS signal 131, are presumed to be correct. The time of day error between slave node 201 and master node 101, which is the phase error to be corrected according to implementations of the subject matter of this disclosure, arises because of error in the slave TAI oscillator 241, which is reflected in the slave PPS signal 231. Therefore, the phase error—i.e., the time of day error between slave node 201 and master node 101—may be measured by determining the difference between the indicated time of day at slave node 201 at a rising edge of slave PPS signal 231 (which is presumed to have drifted) and the indicated time of day at slave node 201 at a rising edge of master PPS signal 131 (which is presumed to be correct).

Figure 3:
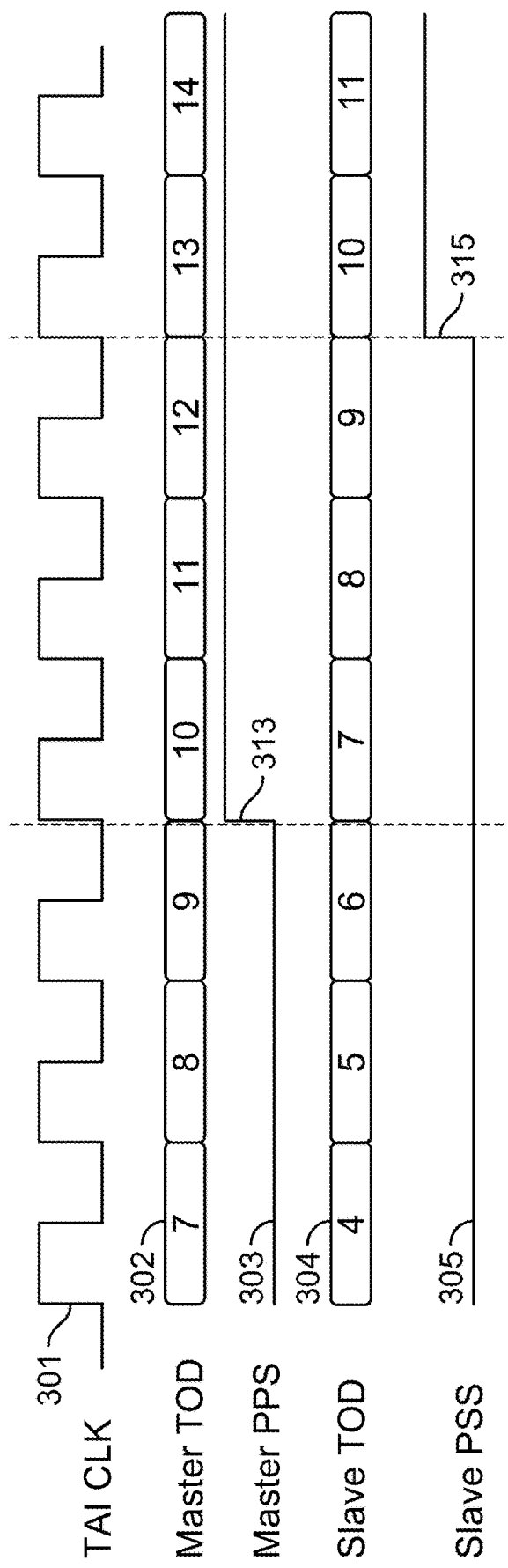
FIG. 3 is a diagram illustrating time-of-day correction in accordance with implementations of the subject matter of this disclosure.

In an illustration diagrammed in FIG. 3, master TOD 302 (i.e., the time of day at master node 101) is indicated by counter 151 that increments at each period of the master TAI oscillator signal (TAI CLK) 301 of master TAI oscillator 141. Slave TOD 304 (i.e., the time of day at slave node 201) is indicated by counter 251 that increments at each period of the slave TAI oscillator signal (not shown) of slave TAI oscillator 241. As seen, slave TOD 304 in this illustration has drifted behind (i.e., is running slow) by 3 counter increments as compared to master TOD 302, and thus the phase error correction value is +3. That correction value (i.e., delta$_{TOD}$—the amount by which slave TOD 304 is wrong relative to master TOD 302) is determined by slave TAI logic circuitry 221 by subtracting the counter value of slave TOD 304 at rising edge 313 of master PPS signal 303 from the counter value of slave TOD 304 at nearest rising edge 315 of slave PPS signal 305:

delta$_{TOD}$=slaveTOD$_{slavePPSedge}$−slaveTOD$_{masterPPSedge}$

This value is negative when slave TOD 304 is behind (i.e., running slow) and positive when slave TOD 304 is ahead (i.e., running fast). In this illustration, delta$_{TOD}$=10−7=+3. Although this illustration is based on nearest rising edges, the determination of delta$_{TOD}$ could also be made using nearest falling edges. More generally, one can refer to "corresponding" edges, and in this disclosure and the claims which follow, edges of different signals are "corresponding" when either both are rising or both are falling. Similarly, in this disclosure and the claims which follow, "nearest" edges are edges that are nearest in time, and therefore "nearest corresponding edges" of different signals are either rising edges nearest in time or falling edges nearest in time, while "nearest corresponding edges" of the same signal are successive rising edges or successive falling edges.

The frequency error deltaTOD$_{step}$ (i.e., how fast or slow the slave TAI clock is running relative to master TAI oscillator signal (TAI CLK) 301) may be expressed as an interval error that is computed by slave TAI logic circuitry 221 as the ratio of (a) the difference between the duration of one interval of slave PPS signal 305 and the duration of one interval of master PPS signal 303, to (b) one TAI clock interval:

$deltaTOD_{step} = deltaPPScycle/TAIclkEdgeCount =$ $(masterPPScyle - slavePPScycle)/TAIclkEdgeCount =$ $\dfrac{(masterPPScycle - (TOD_{slavePPSedge1} - TOD_{slavePPSedge2}))}{TAIclkEdgeCount}$ As noted above, these determinations are made at slave node 201 by slave TAI logic circuitry 221 using only local inputs except for master PPS signal 131. While error in the TAI clock interval is the quantity being determined by this ratio, unless the slave TAI clock has been allowed to run uncorrected for an excessive amount of time (e.g., beyond one slave PPS edge), the TAI clock interval value is close enough to the correct value to derive a valid frequency correction.

For example, if the master TAI clock rate, which also is the nominal slave TAI clock rate, is 1 GHz, but the slave TAI clock runs slow by 5000 ppm, then the period or interval of the master TAI clock is 1 ns, but the interval of the slave TAI clock is 1.005 ns. For this illustration we can assume a PPS of 1 kHz, so that one PPS interval is 1 ms or 1×10$^6$ of the 1 ns intervals of the 1 GHz TAI clock rate.

Figure 4:
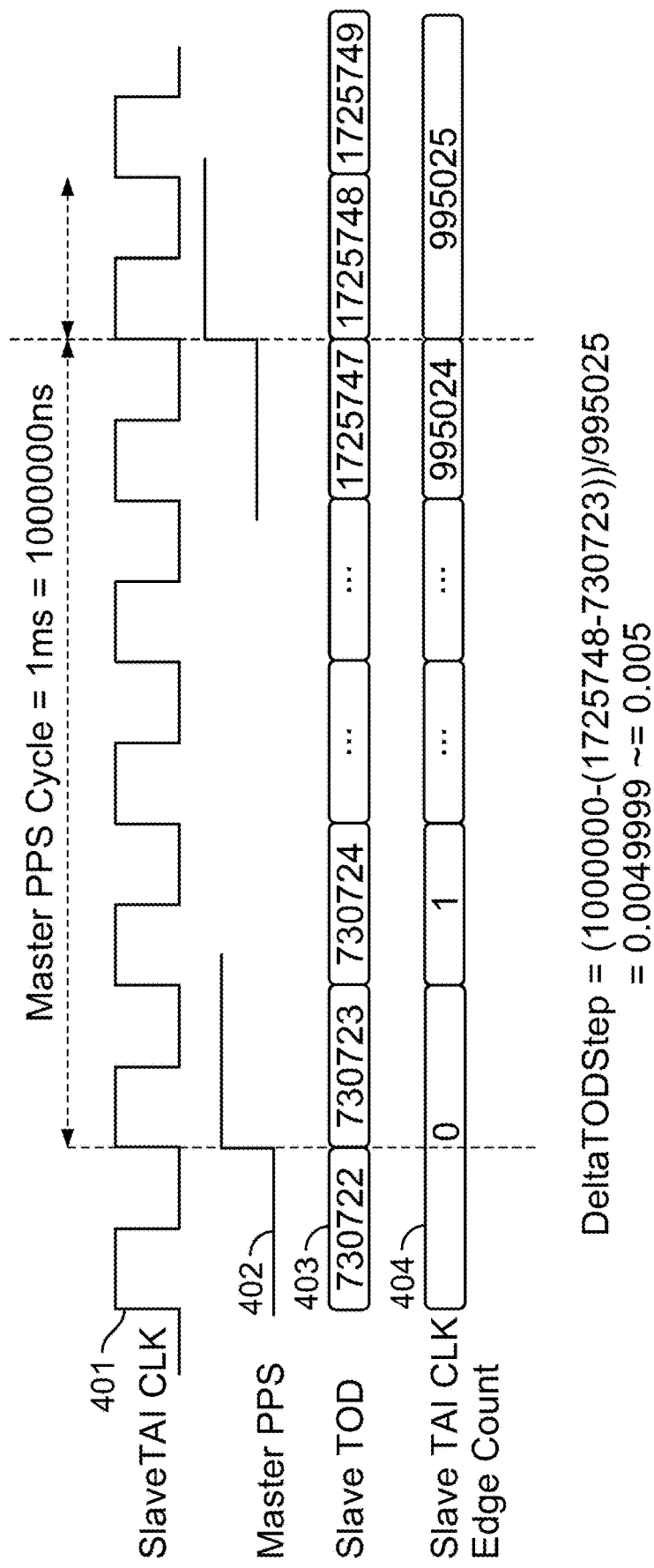
FIG. 4 is a diagram illustrating frequency correction in accordance with implementations of the subject matter of this disclosure.

As seen in the illustration in FIG. 4, for a 1 kHz master PPS 402, during which there should be 1×10$^6$ (i.e., 1,000,000) of the 1 ns intervals of the 1 GHz TAI clock rate, the edge count 404 of the slave TAI CLK 401 is only 995,025, representing 995,025 intervals instead of 1,000,000 intervals. In other words, during that time, the slave time of day 403—i.e., the amount of time that slave node 201 "thinks" has passed—is only 1,725,748−730,723=995,025 intervals. Using only local variables except for master PPS signal 402, the error in the clock interval is therefore calculated as:

$deltaTOD_{step} = (1,000,000 - (1,725,748 - 730,723))/995025 =$ $(1,000,000 - 995,025 = (1,000,000 - 995,025)/995,025 =$ $4,975/995,025 = 0.0049999 \approx 0.005 = 5$ parts per thousand or 5,000 ppm.

The value is positive, meaning that the interval is too large, so that the frequency is too low (running slow).

The foregoing determinations of deltaTOD and deltaTOD$_{step}$ may be made every rg_freq_adj_time_window+1 PPS cycles, where rg_freq_adj_time_window is a preconfigured number, and applied at the following corresponding (i.e., rising or falling) PPS edge. Thus, at the next PPS edge, the time of day is increased by deltaTOD.

At the same PPS edge, the size of the time-of-day step that will be applied at each TAI clock edge from that PPS edge and forward (until the next correction, which may be at the next PPS edge) is also adjusted:

TODstep$_{adj}$=TODstep$_{current}$+deltaTOD$_{step}$ where TODstep$_{current}$ may be the initially-configured value TODstep$_{configured}$ of TODstep if this is the first correction since system initialization, or may be a previous value of TODstep$_{adj}$ if TODstep has previously been adjusted. Thus, at each edge of TAI CLK after the current PPS edge, the then-current time of day will be increased by TODstep$_{adj}$.

nextTOD=currentTOD+TODstep$_{adj}$

At the current PPS edge itself, the then-current time of day will be increased not only by TODstep$_{adj}$, but also by deltaTOD as discussed above:

nextTOD=currentTOD+deltaTOD+TODstep$_{adj}$

This one-time adjustment may cause too much of a discontinuity. Therefore, instead of applying deltaTOD all at once, deltaTOD may be applied over some number of TAI CLK edges starting at the PPS edge. The number of edges may be predetermined, or there may be a predetermined maximum change. For example, if deltaTOD=100 ns, and there is a predetermined maximum change of 5 ns per clock cycle to avoid discontinuities, deltaTOD may be spread over 20 clock cycles, but if deltaTOD is 200 ns, then for that same maximum change per clock cycle, deltaTOD would be spread over 40 clock cycles. Alternatively, if the number of clock cycles over which delatTOD is to be spread is predetermined to be 20, then for deltaTOD=100 ns, each step would be 5 ns, but for deltaTOD=200 ns, each step would be 10 ns.

Figure 5:
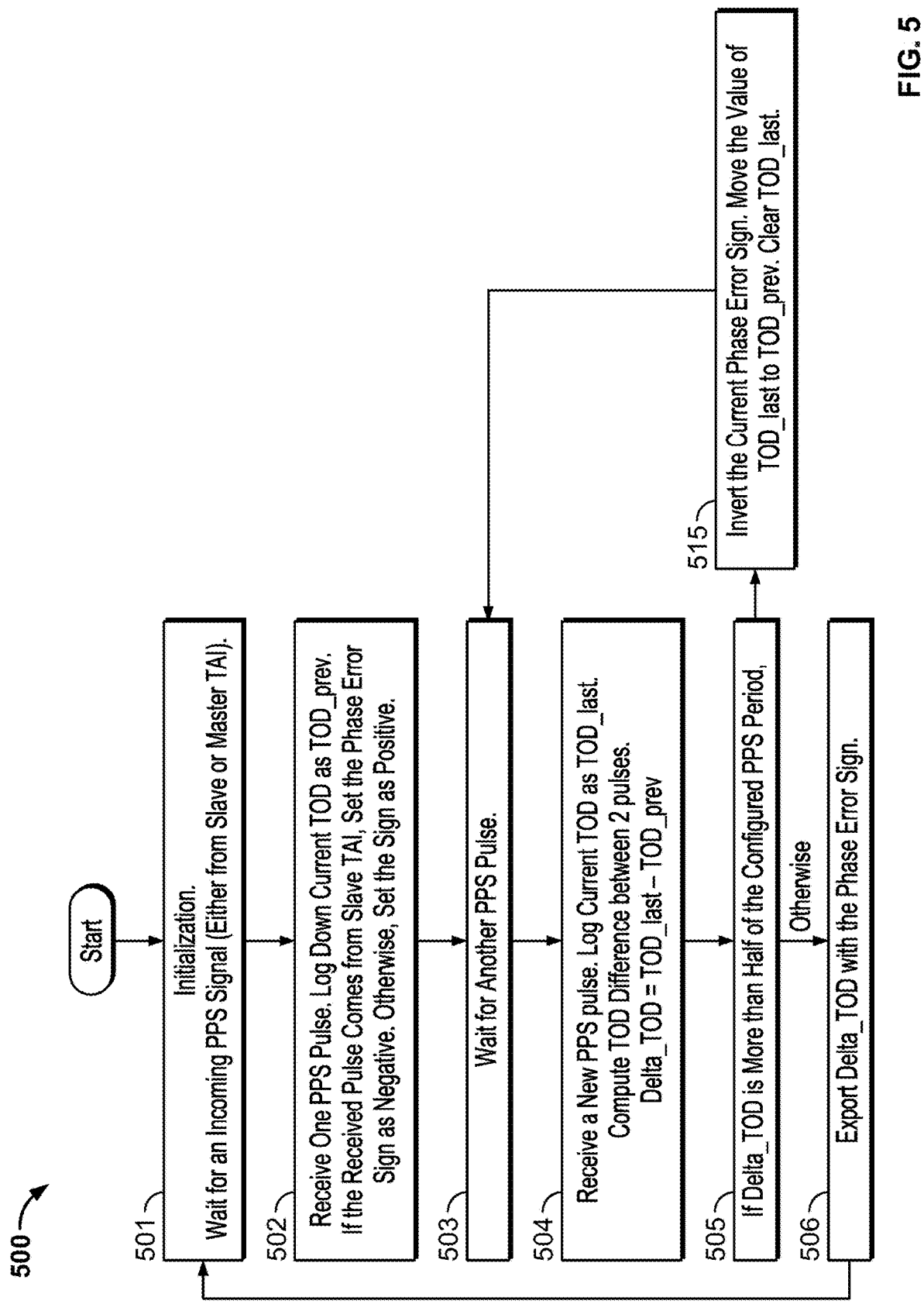
FIG. 5 is a flow diagram illustrating time-of-day correction in accordance with implementations of the subject matter of this disclosure.

The following table represent an illustration where TAI CLK is 1 GHz (i.e., the configured value of TODstep, TODstep$_{configured}$, is 1 ns), the calculated frequency error, deltaTODstep, is 0.01 ns, and by the time the error is calculated, the accumulated time-of-day error, deltaTOD, is 100 ns. This illustration assumes that at time N, TOD=10000 ns, and the next PPS edge, when the corrections are calculated (based on data gathered at that PPS edge and the previous PPS edge, as described below in connection with FIGS. 5 and 6), occurs at time N+1. Because the calculated frequency error, deltaTODstep, is 0.01 ns, the new TOD step value TODStep$_{adj}$ will be 1 ns+0.01 ns=1.01 ns. The "Corrected TOD" column shows the time of day if the entire phase correction, deltaTOD, is applied at once, whereas the "Corrected TOD (with gradual phase error adjustment)" column shows the time of day if the phase correction, deltaTOD, is spread over 20 clock cycles. The time of day starts out the same at 10000 ns in both columns at clock cycle N. By clock cycle N+21, the time of day is again the same in both columns. But the times of day at clock cycles N+1 through N+20 differ, with a large discontinuity in the "Corrected TOD" column at clock cycle N+1 followed by uniform increases thereafter, whereas the times of day in the "Corrected TOD (with gradual phase error adjustment)" column exhibit uniform increases only starting after clock cycle N+21, with twenty smaller discontinuities at clock cycles N+1 through N+20:

FIG. 5 is a flow diagram showing one implementation of a method 500 for determining deltaTOD. At 501, variables are initialized and an incoming PPS signal is awaited (either a master PPS signal or a slave PPS signal).

At 502, when a PPS edge is received, a variable representing the previous time of day (TOD_prev) is set equal to the then-current time of day. If the PPS edge is a slave PPS signal, then the sign of the phase error is deemed to be positive; otherwise the sign of the phase error is deemed to be negative.

At 503, another PPS edge is awaited.

At 504, when another PPS edge is received, a variable representing the most recent time of day (TOD_last) is set equal to the now-current time of day. The potential magnitude of the phase error is computed:

delta_TOD=TOD_last−TOD_prev

At 505 it is determined whether the computed potential phase error magnitude is greater than one half of a clock period or interval. If so, then the sign determined at 502 is inverted, and at 515 the variable representing the previous time of day (TOD_prev) is set equal to the value in the variable representing the most recent time of day (TOD_last), the variable representing the most recent time of day (TOD_last) is cleared, and flow returns to 503 to again await another PPS edge.

If at 505, the computed potential phase error magnitude is not greater than one half of a clock period or interval, then the determination of the phase error magnitude at 504 is deemed to have been correct and at 506 that value is output along with the sign set at 502, and flow returns to 501 to await a next PPS edge to begin the next correction cycle.

| TAI_CLK cycle | Phase/freq error | Corrected TOD | Corrected TOD (with gradual phase error adjustment) |
| --- | --- | --- | --- |
| N | | CurrentTOD = 10000 ns | CurrentTOD = 10000 ns |
| N + 1(PPS edge happens) | Calculated deltaTOD = 100 ns (phase error) deltaTODStep = 0.01 ns (freq error) | 10000 ns + 1 ns + 0.01 ns + 100 ns | 10000 ns + 1 ns + 0.01 ns + 5 ns |
| N + 2 | | 10101.01 ns + 1 ns + 0.01 ns | 10006.01 ns + 1 ns + 0.01 ns + 5 ns |
| N + 3 | | 10102.02 ns + 1 ns + 0.01 ns | 10012.02 ns + 1 ns + 0.01 ns + 5 ns |
| N + 4 | | 10103.03 ns + 1 ns + 0.01 ns | 10018.03 ns + 1 ns + 0.01 ns + 5 ns |
| N + 5 | | 10104.04 ns + 1 ns + 0.01 ns | 10024.04 ns + 1 ns + 0.01 ns + 5 ns |
| N + 6 | | 10105.05 ns + 1 ns + 0.01 ns | 10030.05 ns + 1 ns + 0.01 ns + 5 ns |
| N + 7 | | 10106.06 ns + 1 ns + 0.01 ns | 10036.06 ns + 1 ns + 0.01 ns + 5 ns |
| N + 8 | | 10107.07 ns + 1 ns + 0.01 ns | 10042.07 ns + 1 ns + 0.01 ns + 5 ns |
| N + 9 | | 10108.08 ns + 1 ns + 0.01 ns | 10048.08 ns + 1 ns + 0.01 ns + 5 ns |
| N + 10 | | 10109.09 ns + 1 ns + 0.01 ns | 10054.09 ns + 1 ns + 0.01 ns + 5 ns |
| N + 11 | | 10110.10 ns + 1 ns + 0.01 ns | 10060.10 ns + 1 ns + 0.01 ns + 5 ns |
| N + 12 | | 10111.11 ns + 1 ns + 0.01 ns | 10066.11 ns + 1 ns + 0.01 ns + 5 ns |
| N + 13 | | 10112.12 ns + 1 ns + 0.01 ns | 10072.12 ns + 1 ns + 0.01 ns + 5 ns |
| N + 14 | | 10113.13 ns + 1 ns + 0.01 ns | 10078.13 ns + 1 ns + 0.01 ns + 5 ns |
| N + 15 | | 10114.14 ns + 1 ns + 0.01 ns | 10084.14 ns + 1 ns + 0.01 ns + 5 ns |
| N + 16 | | 10115.15 ns + 1 ns + 0.01 ns | 10090.15 ns + 1 ns + 0.01 ns + 5 ns |
| N + 17 | | 10116.16 ns + 1 ns + 0.01 ns | 10096.16 ns + 1 ns + 0.01 ns + 5 ns |
| N + 18 | | 10117.17 ns + 1 ns + 0.01 ns | 10102.17 ns + 1 ns + 0.01 ns + 5 ns |
| N + 19 | | 10118.18 ns + 1 ns + 0.01 ns | 10108.18 ns + 1 ns + 0.01 ns + 5 ns |
| N + 20 | | 10119.19 ns + 1 ns + 0.01 ns | 10114.19 ns + 1 ns + 0.01 ns + 5 ns |
| N + 21 | | 10120.20 ns + 1 ns + 0.01 ns | 10120.20 ns + 1 ns + 0.01 ns |
| N + 22 | | 10121.21 ns + 1 ns + 0.01 ns | 10121.21 ns + 1 ns + 0.01 ns |
| N + 23 | | 10122.22 ns + 1 ns + 0.01 ns | 10122.22 ns + 1 ns + 0.01 ns |
| N + 24 | | 10123.23 ns + 1 ns + 0.01 ns | 10123.23 ns + 1 ns + 0.01 ns |
| N + 25 | | 10124.24 ns + 1 ns + 0.01 ns | 10124.24 ns + 1 ns + 0.01 ns |
| N + 26 | | 10125.25 ns + 1 ns + 0.01 ns | 10125.25 ns + 1 ns + 0.01 ns |
| N + 27 | | 10126.26 ns + 1 ns + 0.01 ns | 10126.26 ns + 1 ns + 0.01 ns |
| N + 28 | | 10127.27 ns + 1 ns + 0.01 ns | 10127.27 ns + 1 ns + 0.01 ns |
| N + 29 | | 10128.28 ns + 1 ns + 0.01 ns | 10128.28 ns + 1 ns + 0.01 ns |
| N + 30 | | 10129.29 ns + 1 ns + 0.01 ns | 10129.29 ns + 1 ns + 0.01 ns |
| (cont.) | (continued) | (continued) | (continued) |

Figure 6:
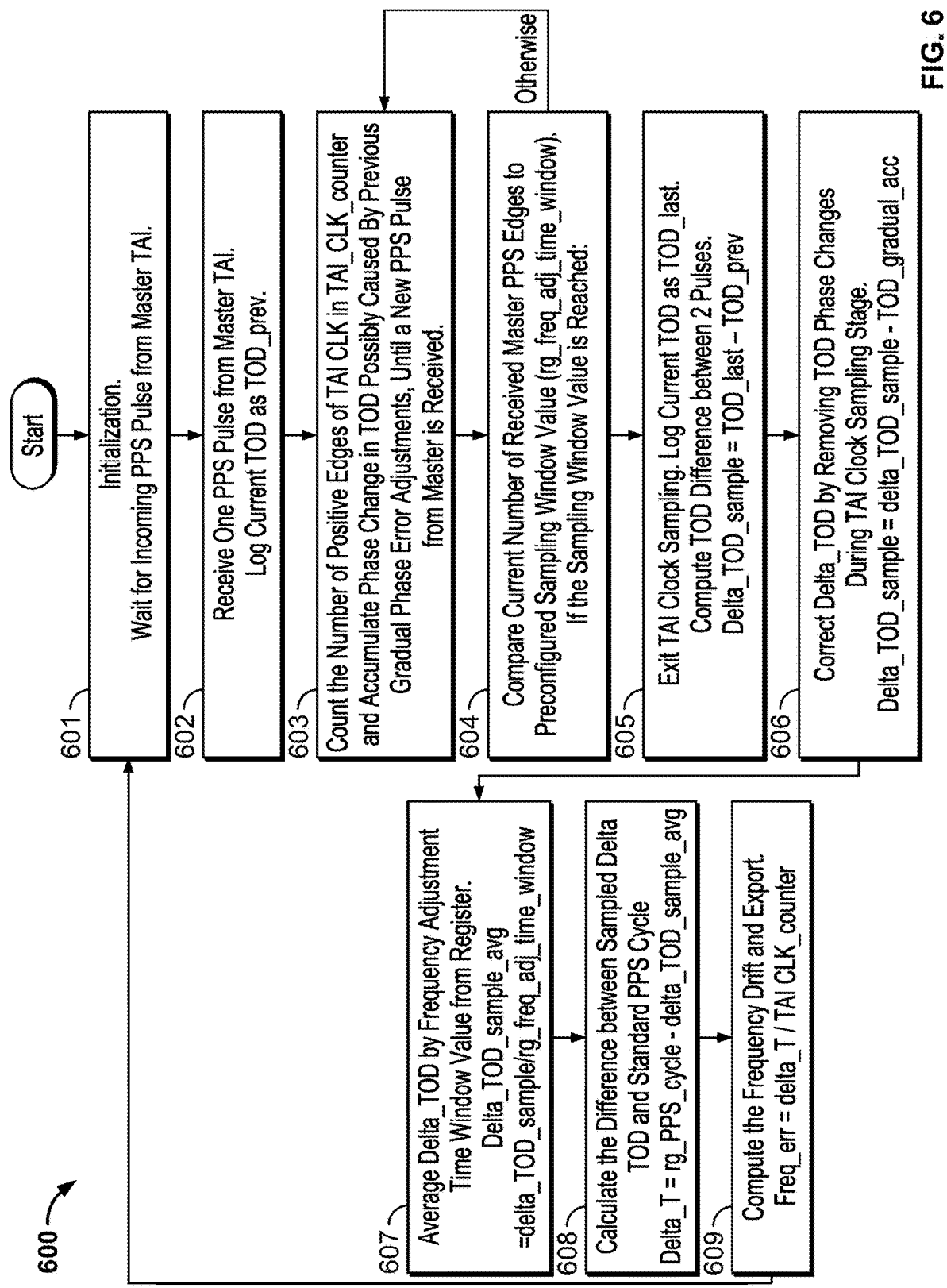
FIG. 6 is a flow diagram illustrating frequency error correction in accordance with implementations of the subject matter of this disclosure.

FIG. 6 is a flow diagram showing one implementation of a method 600 for determining the frequency error (freq_err)—i.e., deltaTODstep. At 601, variables are initialized and an incoming master PPS signal is awaited. At 602, when a master PPS edge is received, a variable representing the previous time of day (TOD_prev) is set equal to the then-current time of day.

At 603 the number of positive TAI CLK edges is accumulated until a new master PPS edge is received. At 604, on the receipt of the next master PPS edge, the number of master PPS edges received is incremented and compared to a preconfigured number of master PPS edges (rg_freq_adj_time_window) defining a desired sampling window size. If the number of master PPS edges received is not equal to the preconfigured number, flow returns to 603, but if the number of master PPS edges is equal to the preconfigured number, then at 605 sampling ends and a variable representing the most recent time of day (TOD_last) is set equal to the now-current time of day. The amount of time that elapsed during the sampling window is computed:

delta_TOD_sample=TOD_last−TOD_prev

At 606, that value is adjusted by subtracting out any previous phase corrections that may have accumulated during the sampling stage:

delta_TOD_sample=delta_TOD_sample−TOD_gradual_acc

At 607, the average value of delta_TOD_sample per PPS interval is computed:

delta_TOD_sample_avg=delta_TOD_sample/rg_freq_adj_time_window

At 608, the difference between delta_TOD_sample_avg and the standard PPS interval is determined:

delta_T=rg_PPS_cycle−delta_TOD_sample_avg

At 609 the frequency drift for the current PPS cycle is computed:

freq_err=delta_T/TAI_CLK_counter and flow returns to 601 to await the next PPS cycle.

Figure 7:
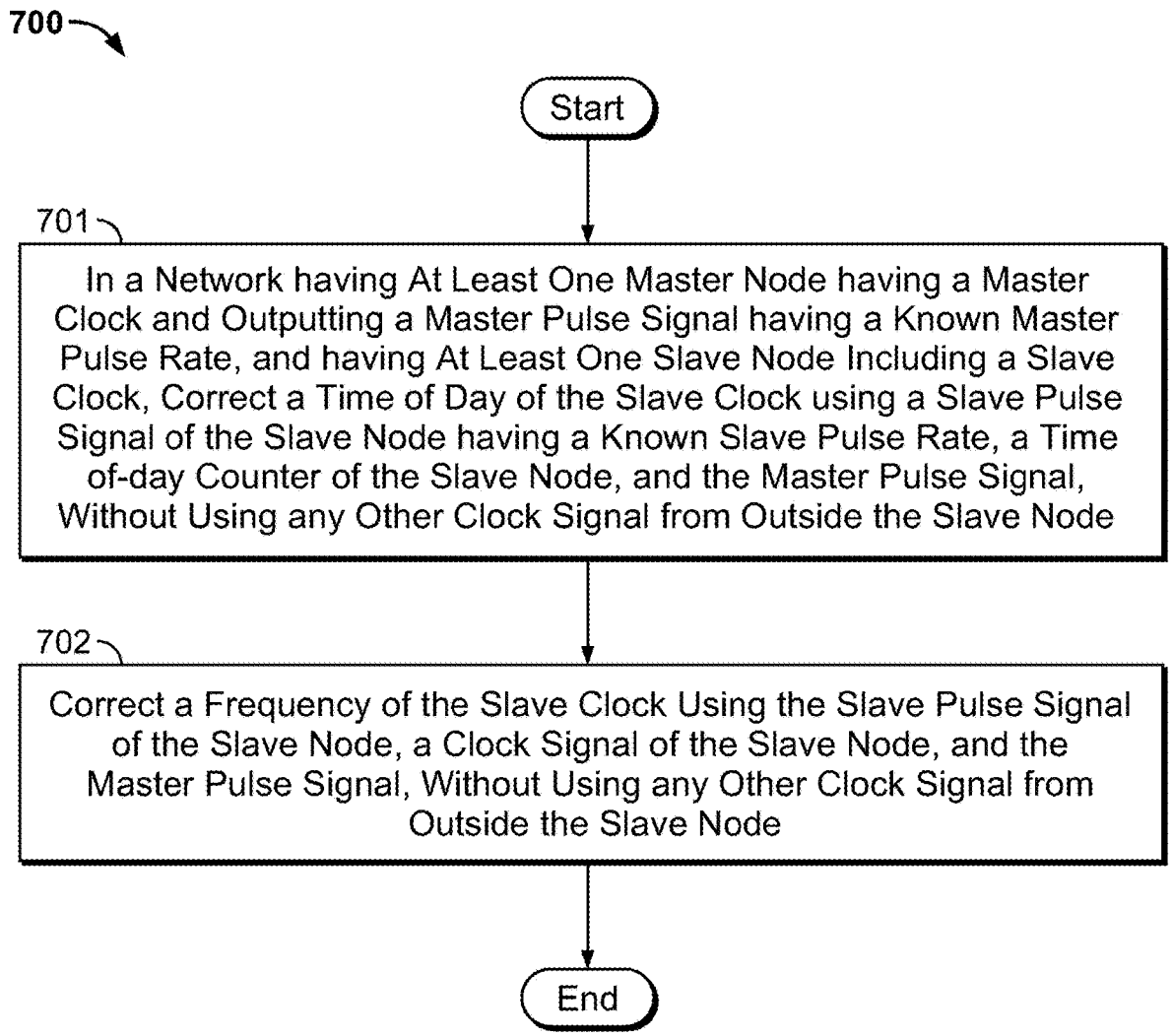
FIG. 7 is a flow diagram illustrating a method in accordance with implementations of the subject matter of this disclosure.

More broadly, a method 700 according to implementations of the subject matter of this disclosure is diagrammed in FIG. 7. Method 700 begins at 701, where, in a network having at least one master node having a master clock and outputting a master pulse signal having a known master pulse rate, and having at least one slave node including a slave clock, a time of day of the slave clock is corrected using a slave pulse signal of the slave node having a known slave pulse rate, a time-of-day counter of the slave node, and the master pulse signal, without using any other clock signal from outside the slave node. At 702, a frequency of the slave clock is corrected using the slave pulse signal of the slave node, a clock signal of the slave node, and the master pulse signal, without using any other clock signal from outside the slave node. Method 700 then ends.

Thus it is seen that an Ethernet node device, which is configured in hardware to separately correct phase and frequency of its time-of-day clock based on its own clock circuitry, as well as only a "pulse-per-second (PPS)" signal from another node, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. In a network having at least one master node, the master node having a master clock and outputting a master "pulse-per-second" signal having a known master pulse rate, the network further having at least one slave node including a slave clock, a method of adjusting the slave clock relative to the master clock, the method comprising, at the slave node:

correcting a time of day of the slave clock using (a) a slave "pulse-per-second" signal of the slave node, the slave "pulse-per-second" signal having a known slave pulse rate, (b) a time-of-day counter of the slave node, and (c) the master "pulse-per-second" signal, without receiving any other clock signal from outside the slave node, based on values of the slave clock at nearest corresponding edges of the slave "pulse-per-second" signal and the master "pulse-per-second" signal; and correcting a frequency of the slave clock using the slave "pulse-per-second" signal of the slave node, a clock signal of the slave node, and the master "pulse-per-second" signal, without receiving any other clock signal from outside the slave node, based on values of the slave clock at nearest corresponding edges of the master "pulse-per-second" signal.

2. The method of adjusting the slave clock according to claim 1, wherein:

using the slave "pulse-per-second" signal comprises using a slave "pulse-per-second" signal that is a "pulse-per-second" signal having a slave pulse rate of 1 pulse per second; and using the master "pulse-per-second" signal comprises using a master "pulse-per-second" signal that is a "pulse-per-second" signal having a master pulse rate of 1 pulse per second.

3. The method of adjusting the slave clock according to claim 1, wherein:

using the slave "pulse-per-second" signal comprises using a slave "pulse-per-second" signal that is a "pulse-per-second" signal having a slave pulse rate of 1,000 pulses per second; and using the master "pulse-per-second" signal comprises using a master "pulse-per-second" signal that is a "pulse-per-second" signal having a master pulse rate of 1,000 pulses per second.

4. The method of adjusting the slave clock according to claim 1, wherein:

using the slave "pulse-per-second" signal comprises using a slave "pulse-per-second" signal that is a "pulse-per-second" signal having a slave pulse rate of 62,500 pulses per second; and using the master "pulse-per-second" signal comprises using a master "pulse-per-second" signal that is a "pulse-per-second" signal having a master pulse rate of 62,500 pulses per second.

5. The method of adjusting the slave clock according to claim 1 wherein correcting the time of day of the slave clock comprises:

retrieving a first counter value from a slave time-of-day counter on occurrence of an edge of the slave "pulse-per-second" signal;

retrieving a second counter value from the slave time-of-day counter on occurrence of an edge of the master "pulse-per-second" signal that is the nearest corresponding edge to edge of the slave "pulse-per-second" signal;

subtracting the first counter value from the second counter value to yield a time-of-day correction; and
adding the time-of-day correction to a current counter value.

6. The method of adjusting the slave clock according to claim 5, further comprising, before adding the time-of-day correction to the current counter value:
determining whether the time-of-day correction exceeds one-half an interval of the slave "pulse-per-second" signal; and
when the time-of-day correction exceeds one-half an interval of the slave "pulse-per-second" signal:
inverting algebraic sign of the time-of-day correction, and
performing again the retrieving the first counter value, the retrieving the second counter value, and the subtracting.

7. The method of adjusting the slave clock according to claim 5 wherein adding the time-of-day correction to the current counter value comprises adding all of the time-of-day correction to the current counter value in a single operation.

8. The method of adjusting the slave clock according to claim 5 wherein adding the time-of-day correction to the current counter value comprises adding each of a plurality of portions of the time-of-day correction in a corresponding plurality of operations spread over time.

9. The method of adjusting the slave clock according to claim 1 wherein correcting the frequency of the slave clock comprises:
retrieving a first counter value from a slave time-of-day counter on occurrence of a first edge of the master "pulse-per-second" signal;
retrieving a second counter value from the slave time-of-day counter on occurrence of a second edge of the master "pulse-per-second" signal that is the nearest corresponding edge to the first edge of the master "pulse-per-second" signal;
subtracting the first counter value from the second counter value to yield a first intermediate correction value;
subtracting the first intermediate correction value from duration of an interval of the master "pulse-per-second" signal to yield a second intermediate correction value; and
dividing the second intermediate correction value by the first intermediate correction value to yield an interval correction for the slave "pulse-per-second" signal.

10. The method of adjusting the slave clock according to claim 9 wherein correcting the frequency of the slave clock further comprises adding the interval correction to the slave "pulse-per-second" signal.

11. A slave node in a network, the network including at least one master node having a master clock and outputting a master "pulse-per-second" signal having a known master pulse rate, the slave node comprising:
a clock signal generator configured to output a slave clock signal, the slave clock signal having a slave clock frequency;
a time of day counter configured to increment at each interval of the slave clock signal to indicate a time of day;
a slave "pulse-per-second" signal generator configured to output a slave "pulse-per-second" signal, the slave "pulse-per-second" signal having a known slave pulse rate lower than the slave clock frequency; and
clock correction circuitry configured to:
correct the time of day using the slave "pulse-per-second" signal and the master "pulse-per-second" signal, without receiving any other clock signal from outside the slave node, based on values of the slave clock at nearest corresponding edges of the slave "pulse-per-second" signal and the master "pulse-per-second" signal; and
correct the slave clock frequency using the slave "pulse-per-second" signal, the slave clock signal, and the master "pulse-per-second" signal, without receiving any other clock signal from outside the slave node, based on values of the slave clock at nearest corresponding edges of the master "pulse-per-second" signal.

12. The slave node of claim 11 wherein:
the slave "pulse-per-second" signal generator is configured to output a slave "pulse-per-second" signal that is a "pulse-per-second" signal having a slave pulse rate of 1 pulse per second; and
the clock correction circuitry is configured to use a master "pulse-per-second" signal that is a "pulse-per-second" signal having a master pulse rate of 1 pulse per second.

13. The slave node of claim 11 wherein:
the slave "pulse-per-second" signal generator is configured to output a slave "pulse-per-second" signal that is a "pulse-per-second" signal having a slave pulse rate of 1,000 pulses per second; and
the clock correction circuitry is configured to use a master "pulse-per-second" signal that is a "pulse-per-second" signal having a master pulse rate of 1,000 pulses per second.

14. The slave node of claim 11 wherein:
the slave "pulse-per-second" signal generator is configured to output a slave "pulse-per-second" signal that is a "pulse-per-second" signal having a slave pulse rate of 62,500 pulses per second; and
the clock correction circuitry is configured to use a master "pulse-per-second" signal that is a "pulse-per-second" signal having a master pulse rate of 62,500 pulses per second.

15. The slave node of claim 11 wherein the clock correction circuitry is configured to correct the time of day by:
retrieving a first counter value from the time-of-day counter on occurrence of an edge of the slave "pulse-per-second" signal;
retrieving a second counter value from the time-of-day counter on occurrence of an edge of the master "pulse-per-second" signal that is the nearest corresponding edge to the edge of the slave "pulse-per-second" signal;
subtracting the first counter value from the second counter value to yield a time-of-day correction; and
adding the time-of-day correction to a current value of the time-of-day counter.

16. The slave node of claim 15 wherein the clock correction circuitry is further configured to, before adding the time-of-day correction to the current counter value:
determine whether the time-of-day correction exceeds one-half an interval of the slave "pulse-per-second" signal; and
when the time-of-day correction exceeds one-half an interval of the slave "pulse-per-second" signal:
invert algebraic sign of the time-of-day correction, and
perform again the retrieving the first counter value, the retrieving the second counter value, and the subtracting.

17. The slave node of claim 15 wherein the clock correction circuitry is configured to add all of the time-of-day correction to the current counter value in a single operation.

18. The slave node of claim 15 wherein the clock correction circuitry is configured to add each of a plurality of portions of the time-of-day correction to the current counter value in a corresponding plurality of operations spread over time.

19. The slave node of claim 11 wherein the clock correction circuitry is configured to correct the frequency of the slave clock by:
   retrieving a first counter value from the time-of-day counter on occurrence of a first edge of the master "pulse-per-second" signal;
   retrieving a second counter value from the time-of-day counter on occurrence of a second edge of the master "pulse-per-second" signal that is the nearest corresponding edge to the first edge of the master "pulse-per-second" signal;
   subtracting the first counter value from the second counter value to yield a first intermediate correction value;
   subtracting the first intermediate correction value from duration of an interval of the master "pulse-per-second" signal to yield a second intermediate correction value; and
   dividing the second intermediate correction value by the first intermediate correction value to yield an interval correction for the slave "pulse-per-second" signal.

20. The slave node of claim 19 wherein the clock correction circuitry is configured to correct the frequency of the slave clock by adding the interval correction to the slave "pulse-per-second" signal.

* * * * *